(No Model.)
J. F. MILLER.
FINGER BAR FOR MOWING AND REAPING MACHINES.
No. 282,749. Patented Aug. 7, 1883.
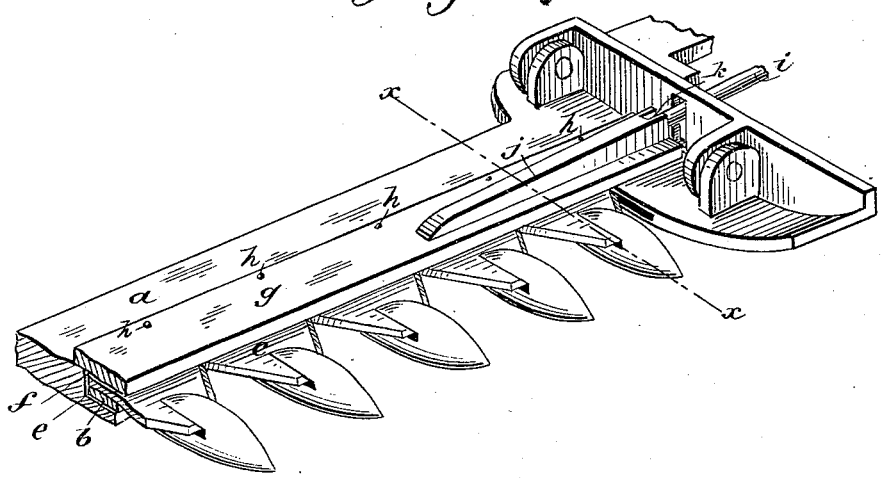
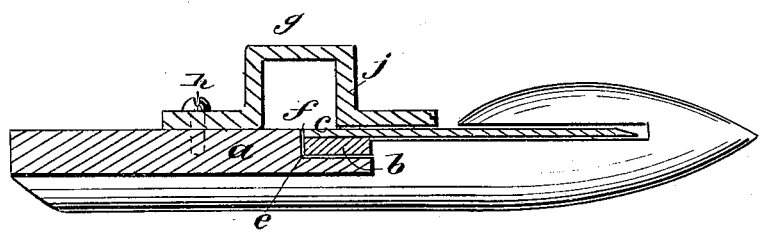
WITNESSES:
INVENTOR:
J. F. Miller
BY
ATTORNEYS.

UNITED STATES PATENT OFFICE.

JAMES F. MILLER, OF SPRING STATION, INDIANA.

FINGER-BAR FOR MOWING AND REAPING MACHINES.

SPECIFICATION forming part of Letters Patent No. 282,749, dated August 7, 1883.

Application filed December 16, 1882. (No model.)

*To all whom it may concern:*

Be it known that I, JAMES F. MILLER, of Spring Station, in the county of Spencer and State of Indiana, have invented a new and useful Improvement in Finger-Bars for Mowing and Reaping Machines, of which the following is a full, clear, and exact description.

My invention consists of an attachment to mowing and reaping machines to prevent the knives and knife-bar from being clogged with dirt in the groove of the finger-bar, the said attachment being a plate attached to the finger-bar, so as to effectually cover and close the crack or joint between it and the back of the knife-bar, the said plate being contrived to serve also as a substitute for the cleats commonly employed to hold the knife-bar down in its place, and also being so contrived as not to interfere with the working of the connecting-rod, and so as not to interfere with the swinging of the finger-bar upright on its pivots, all as hereinafter fully described.

Reference is to be had to the accompanying drawings, forming part of this specification, in which similar letters of reference indicate corresponding parts in both the figures.

Figure 1 is a perspective view of a portion of a mowing-machine, showing the application of my improved contrivance; and Fig. 2 is a cross-section of Fig. 1 on line *x x*.

*a* represents the finger-bar, in which the cutter-bar *b*, with the cutters *c* attached to it, works, the same being in a rabbet or groove, *e*, at the back of which is a joint, *f*, which clogs with earth, straws, and other matters in the machines as commonly constructed, so as to greatly obstruct their operation and cause them to wear out rapidly. I propose to remedy this defect by the application of the plate *g* over the said joint, connecting the same to the finger-bar *a* by rivets or screws *h*, the said plate extending forward over the cutters to the apex of the angles between the cutters, so as to effectually exclude the dirt and keep the joint *f* clear. The plate also fits snugly over the cutters, so that it serves to keep the cutters down in the groove the same as the cleats commonly employed for the purpose do. To prevent the plate from obstructing the connecting-rod *i* and the joint by which it connects with the cutter-bar, I bend up a rib, *j*, along the middle of the plate, and thus form a groove in the lower side for a suitable distance from the end next to the connecting-rod, and I also make a notch, *k*, for a shorter distance in the end of the said rib of the plate to allow the cutter-bar to swing into the upright position, as is commonly done when transporting the machine from place to place.

Having thus described my invention, what I claim as new, and desire to secure by Letters Patent, is—

1. The combination of a plate, *g*, with the finger-bar *a* and the cutters *b c* of a mowing or reaping machine, said plate covering and protecting the joint *f*, and having a raised and grooved section, *j*, for the connecting-rod, substantially as described.

2. The combination of a plate, *g*, with the finger-bar *a* and the cutters *b c* of a mowing or reaping machine, said plate covering and protecting the joint *f*, and having a raised and grooved section, *j*, and a notch, *k*, for the connecting-rod, substantially as described.

JAMES FRANKLIN MILLER.

Witnesses:
G. W. TOTTEN,
CHARLES PAGETT.